Jan. 13, 1959 M. DERANIAN ET AL 2,869,030
DEFLECTION CIRCUITS
Filed May 3, 1954
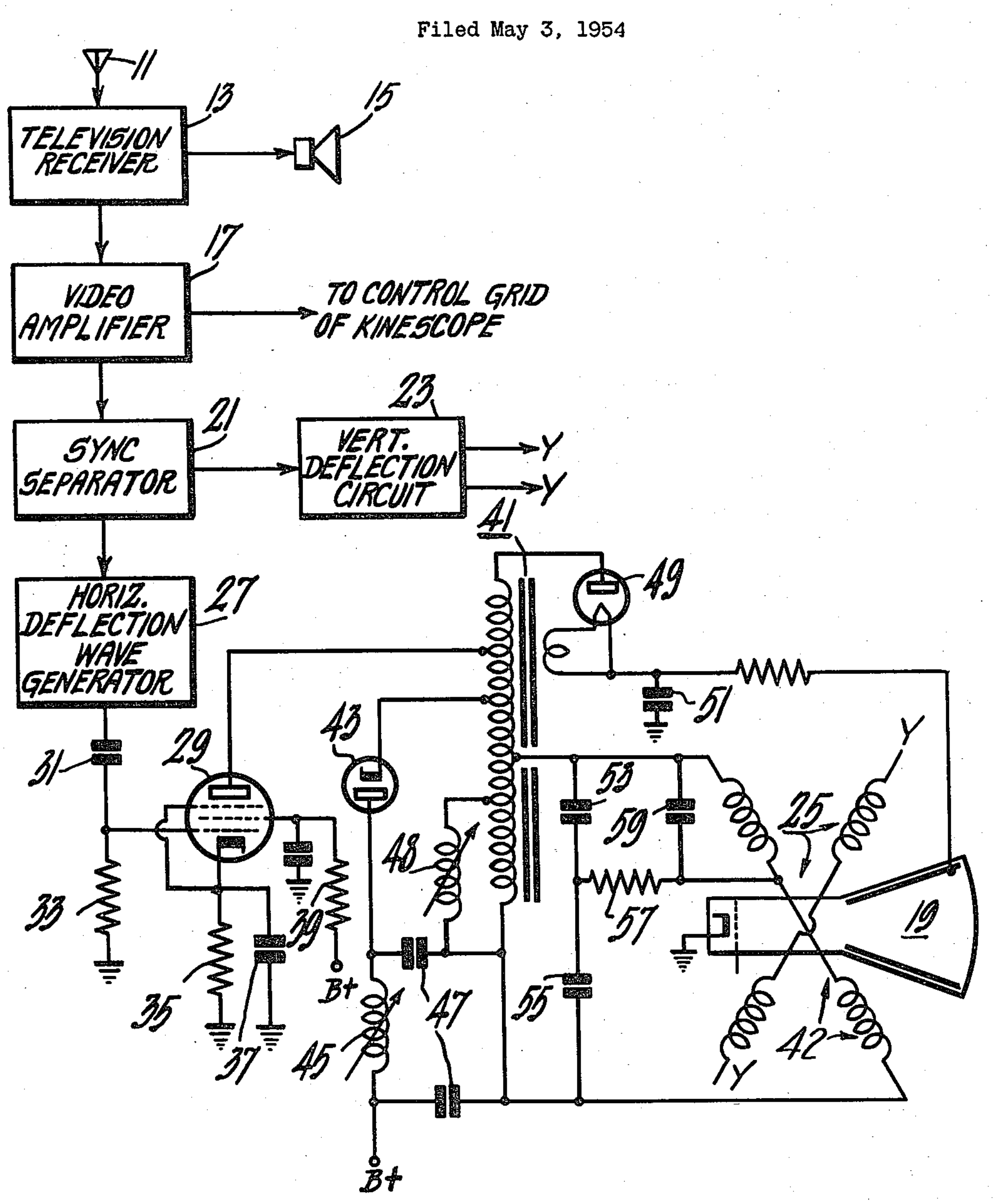
INVENTORS.
MINAS DERANIAN
& BERNARD V. VONDERSCHMITT
BY
ATTORNEY 2,869,030
Patented Jan. 13, 1959

2,869,030

DEFLECTION CIRCUITS

Minas Deranian, Hartford, Conn., and Bernard V. Vonderschmitt, Colwick, N. J., assignors to Radio Corporation of America, a corporation of Delaware Application May 3, 1954, Serial No. 427,202

6 Claims. (Cl. 315—27)

This invention relates to television deflection systems and more particularly to means for damping unwanted oscillations from the windings of a television deflection yoke.

In present television practice, a picture is formed in a cathode ray tube, or kinescope, by an electron beam which is deflected to trace successive lines of a raster upon a fluorescent screen. Deflection of the electron beam is accomplished magnetically by applying sawtooth deflection waves of current to the windings of a deflection yoke mounted about the neck of the cathode ray tube. The deflection yoke comprises two windings to enable the electron beam to be deflected both vertically and horizontally. Under standards set up by the Federal Communications Commission, the electron beam in receivers built for use in the United States is deflected vertically from the top to the bottom of the scanned raster at the rate of 60 times per second. Simultaneously it is deflected horizontally from side to side at the rate of 15,750 times per second.

Both vertical and horizontal deflection waves are generated by sawtooth wave generating circuits which are coupled to the corresponding vertical and horizontal windings of the yoke. In a practical television receiver, a certain amount of inductive coupling, or "crosstalk," results from the physical arrangement of the vertical and horizontal deflection windings mounted in close-spaced relation about the neck of the kinescope.

The horizontal sawtooth deflection waves abruptly change in value at the end of each scanned line to snap the electron beam back to the beginning of the next line in a short time interval. The abrupt change in deflection current is likely to cause spurious oscillations, or "ringing," in the windings of the deflection yoke. A certain amount of ringing may continue after retrace is completed and as a result the electron beam scans at varying velocities causing light and dark lines to appear near the left side of the raster.

In color television practice the resonant oscillations, or ringing, in the deflection yoke windings have a more adverse effect since the electron beams for the three component colors are not affected equally, and their variations in velocity cause narrow bands of color near the left side of the raster. Because of the geometry involved, the electron beam conveying red color information is more affected by crosstalk with the vertical deflection winding and displays a greater tendency towards non-linear scan from the ringing effect than do the electron beams conveying blue and green color information. The resulting color distortion is therefore more pronounced with respect to the reds than it is with the blues or greens. This distortion is a direct result of ringing in the deflection yoke winding and it can be minimized if the ringing is minimized.

It is an object of this invention, therefore, to provide a deflection circuit with improved means for minimizing ringing, or resonant oscillations.

A further object of this invention is to provide a simple deflection circuit having means for minimizing ringing and which can be economically incorporated into the manufacture of commercial television receivers.

According to this invention, a pair of serially connected capacitors is coupled across both of the serially connected sections of the horizontal winding of the deflection yoke. The point of series connection between the capacitors is coupled to the center point between the two sections of the horizontal winding on the yoke. This center point coupling may comprise a resistor to eliminate a raster distortion which may result if the two serially connected capacitors are not equal in value. The capacitors tend to reduce the resonant frequency of the deflection circuit to a value where the ringing will not be objectionable. The center point connection tends to balance the two horizontal winding sections and reduce the effect of crosstalk between the vertical and the horizontal windings of the yoke.

Other objects of this invention will become apparent upon a reading of the specification and an inspection of the accompanying drawing wherein there is shown a circuit diagram, partially in blocks, of a television receiver system including a deflection circuit employing the present invention.

Referring to the drawing in more detail, there is shown the circuit of a television receiver including an antenna 11 which feeds signals to a television receiving circuit 13. This television receiving circuit 13 includes a radio frequency amplifier, a converter section, an intermediate frequency amplifier, and a detector. A sound channel is indicated by a speaker symbol 15. The composite video signal is fed to a video amplifier 17 which in turn provides a video signal for the control grid of a kinescope 19 and synchronizing pulses for the synchronizing signal separating circuit 21. Vertical synchronizing pulses are fed to the vertical deflection circuit 23 which generates a sawtooth deflection wave for the vertical winding 25 of a deflection circuit. Horizontal synchronizing pulses are supplied to the horizontal deflection wave generator 27 which develops a sawtooth voltage wave which is impressed upon the control grid of a horizontal output tube 29 via capacitive coupling 31. The horizontal output tube 29 has associated with it a grid leak resistor 33 for providing the control grid with proper bias, a cathode resistor 35 for biasing the cathode, a bypass capacitor 37 for bypassing alternating current to ground, and a resistor 39 coupling the screen grid to a B+ voltage source (not shown). The horizontal output tube 29 provides power amplification for the deflection waves and sawtooth waves of current are furnished to a horizontal output transformer 41 and thence to the horizontal winding 42 of the deflection circuit.

Oscillations which would result in the deflection circuit are damped out by a damper tube 43 which also provides a direct current path for the anode current of the horizontal output tube 29. The anode of the damper tube is coupled to the B+ voltage supply by a linearity control 45. The damper tube 43 and the linearity control 45 are coupled by capacitors 47 to the low voltage ends of the deflection yoke and the output transformer. An inductive reactor 48 is shunted across a portion of the horizontal output transformer 41 and provides a control for the width of the scanned raster.

High voltage pulses appearing in the horizontal output transformer 41 during retrace intervals are rectified by a high voltage rectifier 49 and stored by a capacitor 51 to provide a direct voltage for the ultor connection to the kinescope 19.

Two capacitors of substantially equal value 53 and 55 are connected in series across the horizontal winding 42 of the deflection circuit. The point of series connection between the capacitors is coupled to the mid-point connection between the horizontal winding 42 of the deflection circuit by a resistor 57. A third capacitor 59 is shunted across that section of the winding 42 of the deflection circuit which is connected at the point of high potential in the output transformer 41.

The serially connected capacitors 53 and 55 function to "swamp out" the oscillations, or ringing, in the horizontal winding 42 of the deflection circuit. Because of different impedance points and resultant higher pulse voltages that exist on the winding 42, the high frequency ringing currents are not balanced in the two sections of the winding 42. To minimize these, the capacitance of the horizontal winding to ground must be reduced to an extremely low value or the effect of the unbalance must be reduced. Connection of the capacitors in parallel with the two sections of the deflection winding tends to minimize the unbalance and also provide a low impedance to the high frequency or ringing components.

If the two serially connected capacitors 53 and 55 were equal in value, then a direct connection would be possible between the mid-point of the deflection winding and the mid-connection between the capacitors. But since commercially produced capacitors vary somewhat within rather broad tolerances, the resistor 57 is provided to eliminate the necessity of precise balance between the two capacitors 53 and 55.

Successful operation of this circuit has been attained by using values of substantially 180 micromicrofarads for each of the capacitors 53 and 55, thereby coupling a total of 90 micromicrofarads capacitance across the yoke winding. Resistor 57 had a value of 4700 ohms and capacitor 59 had a value of 220 micromicrofarads.

Having described this invention, what is claimed is:

1. In a television receiver, a deflection circuit arrangement including, a deflection winding having two serially connected sections, means to apply deflection current to said winding, and means for minimizing spurious ringing currents appearing in said winding comprising a pair of capacitors connected in series across said winding and a resistor connected between the junction of said capacitors and the junction of said sections of said winding.

2. In a television receiver, a deflection circuit arrangement including, a deflection winding having two serially connected sections, a transformer having a winding connected to said deflection winding to apply deflection currents to said deflection winding, and means for minimizing spurious ringing currents appearing in said deflection winding comprising a pair of capacitors connected in series across said deflection winding and a resistor connected between the junction of said capacitors and the junction of said sections of said deflection winding.

3. In a television receiver, a deflection circuit arrangement including, a deflection winding having two serially connected sections, a transformer having a winding connected to said deflection winding to apply deflection currents to said deflection winding, and means for minimizing spurious ringing currents appearing in said deflection winding comprising a pair of capacitors of substantially equal capacity connected in series across said deflection winding and a resistor connected between the junction of said capacitors and the junction of said sections of said deflection winding.

4. In a television receiver, a deflection circuit arrangement including; a deflection winding having two serially connected sections; a transformer having a winding connected to said deflection winding to apply deflection currents to said deflection winding; and means for minimizing spurious ringing currents appearing in said deflection winding comprising a capacitor shunting one section of said deflection winding, a pair of capacitors of substantially equal capacity connected in series across said deflection winding, and a resistor connected between the junction of said capacitors and the junction of said sections of said deflecting winding.

5. In a cathode ray tube deflection circuit, the combination comprising a deflection wave transformer, a deflection winding having two serially connected sections, means for connecting said deflection winding across a winding of said deflection wave transformer, and means for minimizing ringing in said sections of said deflection winding comprising a pair of capacitors of substantially equal capacity connected in series across said transformer winding and a direct current connection between the junction of said capacitors and the junction of said sections of said deflection winding.

6. In a cathode ray tube deflection circuit, the combination comprising a deflection winding having two serially connected sections, a transformer having a winding connected to said deflection winding to apply deflection currents to said deflection winding, and means for minimizing spurious ringing currents appearing in said deflection winding comprising a pair of capacitors of substantially equal capacity connected in series across said deflection winding and a direct current connection between the junction of said serially connected capacitors and the junction of said serially connected deflection winding sections.

References Cited in the file of this patent

UNITED STATES PATENTS

| | | |
|---|---|---|
| 2,396,476 | Schade | Mar. 12, 1946 |
| 2,536,857 | Schade | Jan. 2, 1951 |
| 2,606,306 | Bridges | Aug. 5, 1952 |
| 2,612,622 | Thalner | Sept. 30, 1952 |
| 2,658,163 | De Cola | Nov. 3, 1953 |